United States Patent
Nozawa

(10) Patent No.: US 8,864,335 B2
(45) Date of Patent: Oct. 21, 2014

(54) ILLUMINATING DEVICE, DISPLAY DEVICE, AND TELEVISION RECEIVING DEVICE

(75) Inventor: Shinnosuke Nozawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 315 days.

(21) Appl. No.: 13/522,532

(22) PCT Filed: Nov. 16, 2010

(86) PCT No.: PCT/JP2010/070343
§ 371 (c)(1),
(2), (4) Date: Jul. 17, 2012

(87) PCT Pub. No.: WO2011/089778
PCT Pub. Date: Jul. 28, 2011

(65) Prior Publication Data
US 2012/0293535 A1 Nov. 22, 2012

(30) Foreign Application Priority Data

Jan. 25, 2010 (JP) .................... 2010-013342

(51) Int. Cl.
| | |
|---|---|
| *F21S 4/00* | (2006.01) |
| *F28D 1/053* | (2006.01) |
| *G09G 3/00* | (2006.01) |
| *F28D 15/00* | (2006.01) |
| *G02F 1/1335* | (2006.01) |
| *F28D 21/00* | (2006.01) |

(52) U.S. Cl.
CPC .................. *G02F 1/133603* (2013.01); *G02F 2001/133628* (2013.01); *F28D 2021/0031* (2013.01); *F28D 1/05383* (2013.01); *G09G 3/00* (2013.01); *G02F 1/133608* (2013.01); *F28D 2021/0028* (2013.01); *G02F 2001/133601* (2013.01); *F28D 15/00* (2013.01)
USPC ....... 362/249.02; 362/547; 362/218; 362/373

(58) Field of Classification Search
USPC .................... 362/249.02, 632, 547, 218, 373
See application file for complete search history.

(56) References Cited

U.S. PATENT DOCUMENTS

| | | |
|---|---|---|
| 2003/0052584 A1 | 3/2003 | Matsui et al. |
| 2007/0147045 A1 | 6/2007 | Kimura et al. |
| 2010/0277671 A1 | 11/2010 | Kimura et al. |

FOREIGN PATENT DOCUMENTS

| | | | |
|---|---|---|---|
| EP | 1 717 632 A1 | 11/2006 | |
| JP | 2006-253205 A | 9/2006 | |

(Continued)

OTHER PUBLICATIONS

Official Communication issued in International Patent Application No. PCT/JP2010/070343, mailed on Feb. 15, 2011.

(Continued)

*Primary Examiner* — Vip Patel
(74) *Attorney, Agent, or Firm* — Keatng & Bennett, LLP

(57) ABSTRACT

Provided is an illuminating device that is capable of improving use efficiency of cooling fluid used for cooling LEDs. An illuminating device (4) includes LEDs (13), a chassis (14) including a holding surface (14*b*) on which the LEDs are arranged in a matrix, cooling members (20) that are disposed on the chassis at positions associated with positions of the LEDs, each of the members including a channel (20*a*) inside, through which cooling fluid runs and a valve (21) opening and closing the channel, a radiator (22) performing heat exchange between the fluid and air, a pump (24) connected to the members and the radiator by pipes (25, 26) and circulating the fluid, an LED control unit (43) controlling driving of the LEDs, and cooling-member control units (44) controlling driving of the valves of the members associated with the LEDs based on the driving of the LEDs.

10 Claims, 11 Drawing Sheets

(56) References Cited

FOREIGN PATENT DOCUMENTS

| | | |
|---|---|---|
| JP | 2007-200869 A | 8/2007 |
| JP | 2009-064678 A | 3/2009 |
| WO | 2007/056599 A2 | 5/2007 |
| WO | 2009/065125 A2 | 5/2009 |

OTHER PUBLICATIONS

Official Communication issued in corresponding European Patent Application No. 10843942.3 mailed on Oct. 30, 2013.

ILLUMINATING DEVICE, DISPLAY DEVICE, AND TELEVISION RECEIVING DEVICE

TECHNICAL FIELD

The present invention relates to an illuminating device that includes LEDs as a light source, a display device including the illuminating device that is disposed behind a display panel, and a television receiving device including the display device.

BACKGROUND ART

A liquid crystal display device including a transmissive liquid crystal display panel, which is an example of a flat-screen display device, generally includes an illuminating device that is disposed behind the liquid crystal display panel. The illuminating device includes a fluorescent lamp such as a cold cathode tube that defines a light source, and arranged to adjust the properties of light emitted from the fluorescent lamp and project the light onto a back surface of the liquid crystal display panel. The projected light passes through the liquid crystal display panel and makes an image displayed visible on a front side of the liquid crystal display panel.

Recently, not only the fluorescent lamp but also power-thrifty long-life light-emitting diodes (LEDs) have been used for the light source incorporated in the illuminating device.

In general, when the LEDs are used for long time under a hot environment, the brightness of the LEDs degrades and the longevity of the LEDs is remarkably reduced, so that the LEDs need to be cooled. For example, PTL 1 discloses a configuration with which LEDs are cooled.

FIGS. 11A and 11B are views showing LED substrates, and an illuminating device including the LED substrates, where FIG. 11A is a cross-sectional view showing the LED substrate, and FIG. 11B is a plan view of the illuminating device in which the plurality of the LED substrates are arranged in parallel.

Each LED substrate 201 includes a plurality of LEDs 204 that are disposed on an upper surface of a long flat tube 202 while sandwiching therebetween an insulating layer 203 as shown in FIGS. 11A and 11B. In this case, each flat tube 202 that defines a base material of each LED substrate 201 includes a plurality of channels 202a inside, through which cooling fluid runs as shown in FIG. 11A. Thus, the heat emitted from the LEDs 204 is removed to cool the LEDs 204 by passing the cooling fluid through the channels 202a.

An illuminating device 200 includes the plurality of LED substrates 201 that are arranged in parallel, and headers 205 and 206 that are communicated with the flat tubes 202 and attached to both the ends of the LED substrates 201 as shown in FIG. 11B, whereby the cooling fluid can be supplied to the plurality of flat tubes 202 at the same time.

In this case, The headers 205 and 206 are connected to a radiator 207 that defines an air-cooled heat exchanger arranged to cool the cooling fluid, a piston-type reciprocating pump 208 arranged to pass the cooling fluid, and a tank 209 arrange to maintain the amount of the cooling fluid via a pipe 210. Thus, cooling of the LEDs 204 is performed by the cooling fluid circulating through the flat tubes 202 of the LED substrates 201 and the radiator 207.

CITATION LIST

Patent Literature

PTL 1: JP2006-253205

SUMMARY OF INVENTION

Technical problem

However, a problem arises such that because the illuminating device 200 has a configuration to cool all the LEDs 204, when some of the LEDs 204 are lit while the others are not, not only the lit LEDs 204 but also the unlit LEDs are cooled to cause the used cooling fluid to deteriorate quickly. Thus, cooling capability of the cooling fluid is lowered. That is, there arises a possibility such that cooling of the LEDs 204 cannot be performed sufficiently, which causes a problem of reduced use efficiency of the cooling fluid.

The present invention is made in view of the problems described above, and an object of the present invention is to provide an illuminating device that is capable of improving use efficiency of cooling fluid that is used for cooling LEDs, a display device including the illuminating device, and a television receiving device including the display device.

Solution to Problem

To achieve the objects and in accordance with the purpose of the present invention, an illuminating device of a preferred embodiment of the present invention includes a plurality of LEDs, a chassis including a holding surface on which the LEDs are arranged in a matrix, a plurality of cooling members that are disposed on the chassis at positions associated with positions of the LEDs, each of the cooling members including a channel inside through which cooling fluid runs and a valve arranged to open and close the channel, a radiator arranged to perform heat exchange between the cooling fluid and air, a pump connected to the cooling members and the radiator by pipes and arranged to circulate the cooling fluid, an LED control unit arranged to control driving of the LEDs, and cooling-member control units arranged to control driving of the valves of the cooling members associated with the LEDs based on the driving of the LEDs.

Having the configuration described above, the illuminating device is capable of controlling the driving (on-off driving) of the LEDs with the use of the LED control unit, and controlling the driving of the valves of the cooling members associated with the LEDs based on the driving of the LEDs with the use of the cooling-member control units, i.e., controlling cooling operation of the LEDs by pas sing the cooling fluid in the cooling members. Thus, this configuration makes it possible to control to drive the valves of the cooling members associated with the lit LEDs so as to cool the lit LEDs by associated the cooling members, while making it possible to control not to drive the valves of the cooling members associated with the unlit LEDs so as not to cool the unlit LEDs by the associated cooling members.

The illuminating device is capable of selectively cooling the lit LEDs that generate heat by selectively operating the cooling members. The LEDs that need to be cooled can be cooled effectively and the cooling fluid can be prevented from deteriorating quickly compared with a conventional illuminating device that has a configuration to cool all LEDs, some of which are lit while the others are not. Thus, the illuminating device of the present invention is capable of preventing cooling capability of the cooling fluid from being lowered due to quick deterioration of the cooking fluid, and is also capable of improving use efficiency of the cooling fluid.

It is preferable that the illuminating device has a configuration that each of the cooling members is associated with some of the LEDs. If any of the LEDs associated with one cooling member is lit, the valve of the one cooling member is driven simultaneously with the lighting of the LED, which allows the lit LED to be cooled. In addition, the number of the provided cooling members can be reduced compared with a case where the cooling members are associated with the LEDs one by one.

It is preferable that the illuminating device has a configuration that the cooling members are disposed at middle positions between the adjacent LEDs. This configuration allows the adjacent LEDs to be cooled equally, which allows the lit LEDs to be cooled efficiently by the cooling members.

It is preferable that the valves of the cooling members define flow control valves, which are controlled by the cooling-member control units to increase and decrease amounts of flow of the cooling fluid that runs in the cooling members in accordance with the driving of the associated LEDs. If each of the cooling members is associated with some of the LEDs, this configuration makes it possible to change cooling capability (cooling power) of the cooling members with the use of the valves (flow control valves) that adjust the amounts of the flow of the cooling fluid that runs in the cooling members in accordance with the number of the lit LEDs. To be specific, if one cooling member is associated with four LEDs, for example, and one of the LEDs is lit, the valve opens its valve to the degree of one fourth with respect to the fully opened degree. If one cooling member is associated with four LEDs, for example, and three of the LEDs are lit, the valve can be opened to the degree of three fourths with respect to the fully opened degree. In addition, when the amount of current passing through the LEDs is increased in order to increase the brightness of the LEDs more than usual, this configuration makes it possible to increase the amounts of the flow of the cooling fluid that runs in the cooling members more than usual, and thus the LEDs that generate heat more due to the increased brightness can be cooled in a positive manner.

Having the configuration that the amounts of flow of the cooling fluid that runs in the cooling members can be increased and decreased in accordance with the numbers of the lit LEDs that are associated with the cooling members and in accordance with the increased brightness of the LEDs, the illuminating device is capable of cooling the heated LEDs efficiently. In addition, a rise in temperature of the cooling fluid can be curbed, so that the cooling fluid can be cooled sufficiently by the radiator.

In addition, it is preferable that the cooling members are disposed on a back surface of the chassis, which is opposite to the holding surface. This configuration makes it possible to cool portions of the chassis that neighbor the cooling members, whereby the LEDs can be cooled indirectly via the portions of the chassis that neighbor the cooling members. In addition, because the LEDs and the cooling members are not disposed on the same side of the chassis, it is easy to install the LEDs and the cooling members. It is preferable that the illuminating device further includes a thermal conductive sheet, wherein the cooling members are disposed on the back surface of the chassis while sandwiching therebetween the thermal conductive sheet. This configuration makes it possible for the cooling members to efficiently cool the heated LEDs.

In another aspect of the present invention, a display device of a preferred embodiment of the present invention includes a display panel including a region where an image is displayed, and the above-described illuminating device that is disposed behind the display panel. Having the configuration described above, the display device is capable of cooling the LEDs disposed on the holding surface of the chassis of the illuminating device in accordance with on-off states of the LEDs with the use of the cooling members through which the cooling fluid runs. Thus, the cooling fluid can be prevented from deteriorating quickly, and use efficiency of the cooling fluid can be improved.

It is preferable that the display device further includes an image-signal processing unit arranged to process a signal for displaying the image, and a display-panel control unit arranged to control driving of the display panel based on an output signal from the image-signal processing unit, wherein the LED control unit and the cooling-member control units are arranged to control the driving of the LEDs and the driving of the valves of the cooling members, respectively, based on the output signal from the image-signal processing unit.

This configuration makes it possible to turn on the LEDs that correspond to the region other than the region displayed in black in the displayed image while turning off (unlighting) the LEDs that correspond to the region displayed in black as shown in FIG. 10 by controlling the driving of the LEDs with the use of the LED control unit based on the output signal from the image-signal processing unit. Thus, contrast in the displayed image can be improved. Further, the display device is capable of operating the cooling members associated with the lit LEDs while not operating the cooling members associated with the unlit LEDs by controlling operation of the cooling members with the use of the cooling-member control units based on the output signal from the image-signal processing unit, so that the LEDs that need to be cooled can be cooled effectively, and use efficiency of the cooling fluid can be improved.

Advantageous Effects of Invention

Because the illuminating device is capable of selectively cooling the lit LEDs that generate heat by selectively operating the cooling members through which the cooling fluid runs, the LEDs that need to be cooled can be cooled effectively and the cooling fluid can be prevented from deteriorating quickly compared with a conventional illuminating device that has a configuration to cool all LEDs, some of which are lit while the others are not.

DESCRIPTION OF EMBODIMENTS

A detailed description of an illuminating device, a display device and a television receiving device of preferred embodiments of the present invention will now be provided with reference to the accompanying drawings.

Figure 1:
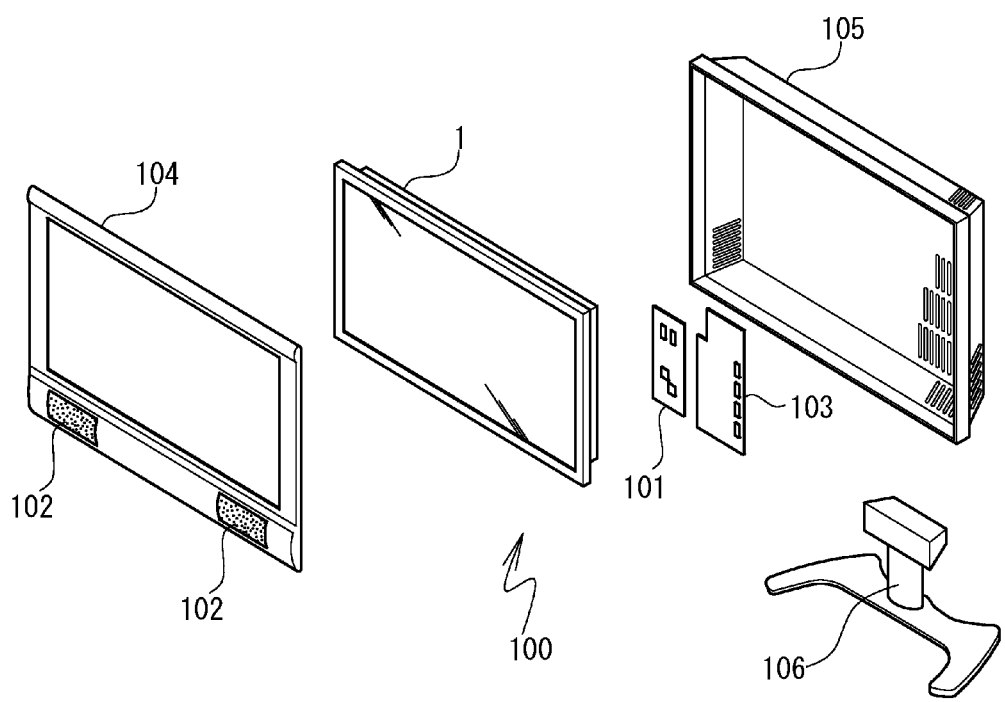
FIG. 1 is an exploded perspective view showing a schematic configuration of a television receiving device of a preferred embodiment of the present invention.

FIG. 1 is an exploded perspective view showing a schematic configuration of the television receiving device of the preferred embodiment of the present invention. A television receiving device 100 includes a liquid crystal display panel 1, a tuner 101, speakers 102, and an electric power substrate 103 arranged to supply electric power to the liquid crystal display device 1, the tuner 101, the speakers 102 as shown in FIG. 1. The liquid crystal display device 1, the tuner 101, the speakers 102 and the electric power substrate 103 are housed in a housing consisting of a front side cabinet 104 and a back side cabinet 105, which is supported by a stand 106.

Figure 2:
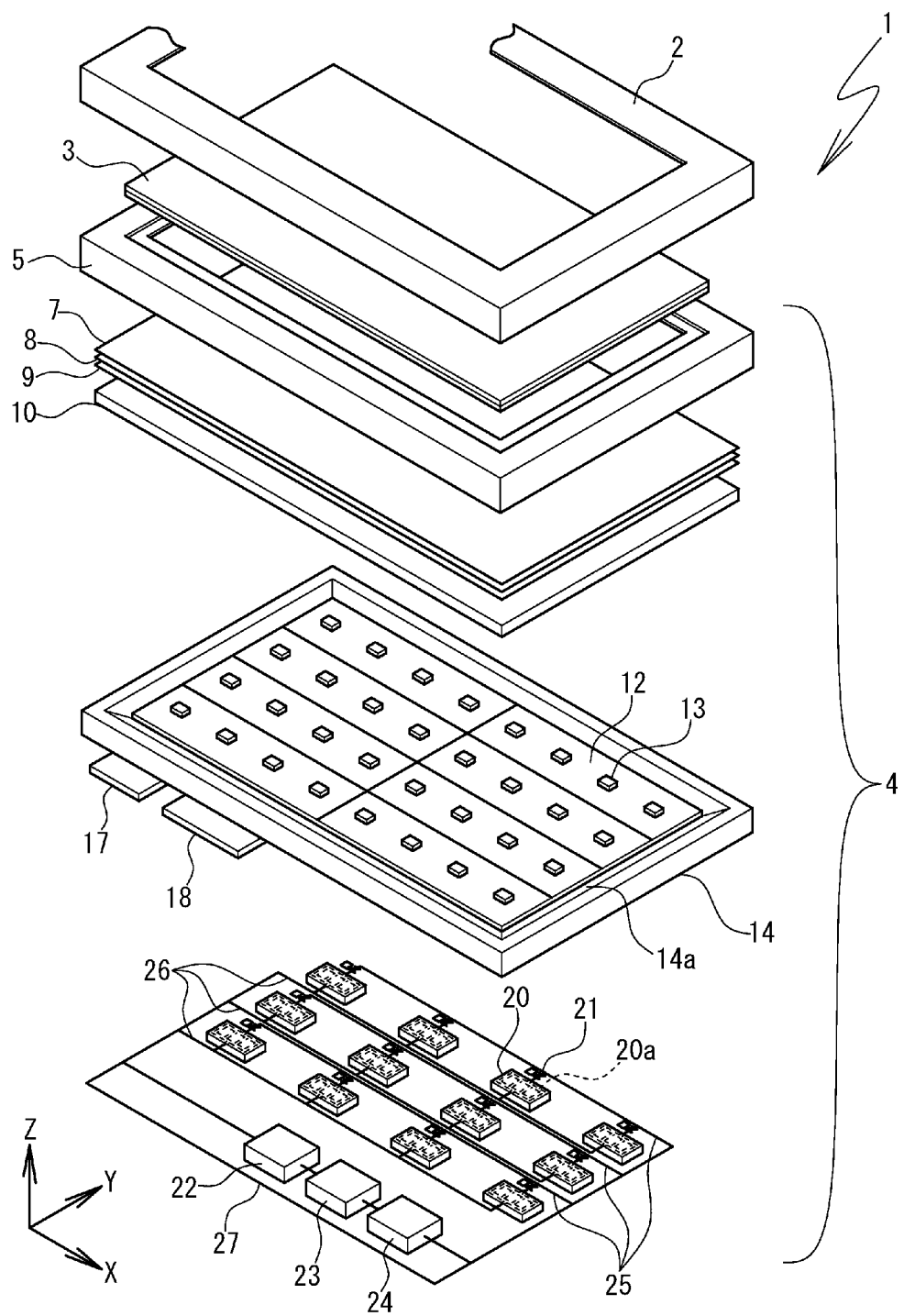
FIG. 2 is an exploded perspective view showing a schematic configuration of a liquid crystal display device included in the television receiving device shown in FIG. 1.
Figure 3:
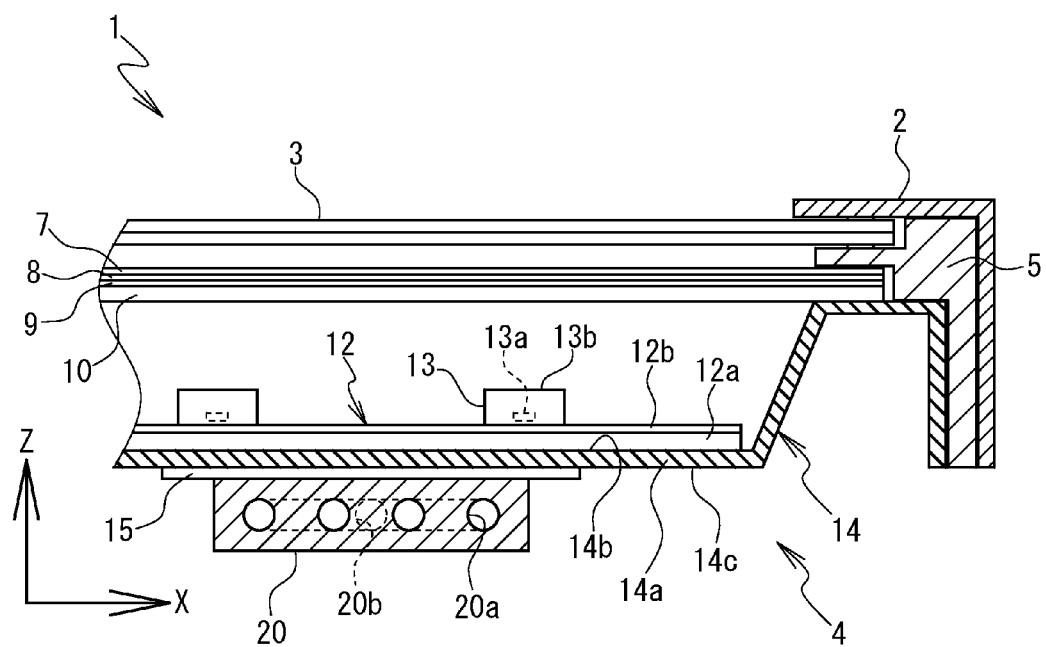
FIG. 3 is an enlarged cross-sectional view showing a relevant portion of the liquid crystal display device shown in FIG. 2 after being assembled.

FIG. 2 is an exploded perspective view showing a schematic configuration of the liquid crystal display device 1 of the present embodiment. FIG. 3 is an enlarged cross-sectional view showing a relevant portion of the liquid crystal display device 1. The liquid crystal display device 1 includes a bezel 2, a liquid crystal display panel 3 and an illuminating device 4 as shown in FIGS. 2 and 3.

The bezel 2 has a square frame shape with an opening so as to cover edge portions of the liquid crystal display panel 3, and is arranged to, together with a backlight chassis 14 of the illuminating device to be described later, ensure strength of the entire liquid crystal display device 1.

The liquid crystal display panel 3 includes a pair of glass substrates consisting of a thin film transistor (TFT) array substrate and a color filter (CF) substrate that are bonded together so as to be parallel to each other having a given space therebetween, in which liquid crystals are filled.

A plurality of TFTs and pixel electrodes are arranged in a matrix on the TFT array substrate. A plurality of color filters are arranged in a matrix on the CF substrate, and a common electrode is provided over the CF substrate. By varying a voltage applied to the pixel electrodes and the common electrode, alignment of the liquid crystals can be controlled, whereby an image can be displayed.

Figure 8:
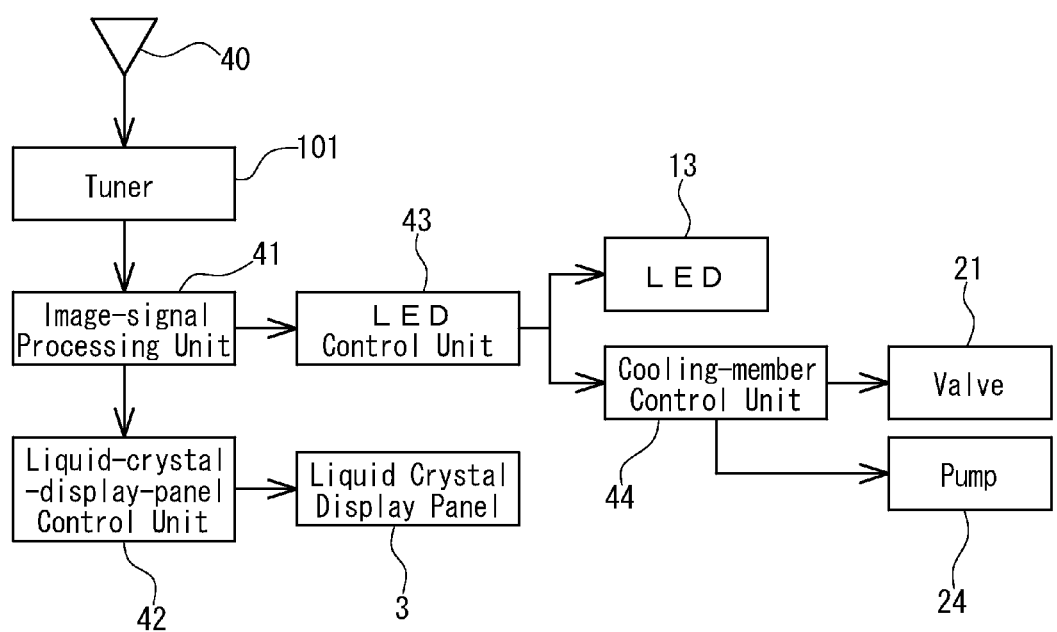
FIG. 8 is a block diagram showing a schematic configuration of an electric circuit of the television receiving device.

A liquid-crystal-display-panel control unit 42 is arranged to control driving of the liquid crystal display panel 3 as shown in FIG. 8. In the present embodiment, the liquid-crystal-display-panel control unit 42 is arranged to output a control signal to the liquid crystal display panel 3 based on an output signal outputted from an image-signal processing unit 41, and control the driving of the liquid crystal display panel 3. A given image is displayed in an image display region of the liquid crystal display panel 3 by the control performed by the liquid-crystal-display-panel control unit 42 and by light that is projected onto a back surface of the liquid crystal display panel 3. An image signal inputted from the tuner 101 via an antenna 40 is subjected to image processing by the image-signal processing unit 41, and the signal subjected to the image processing is outputted to the liquid-crystal-display-panel control unit 42.

The illuminating device 4 defines a so-called direct illuminating device (backlight device) that is used disposed behind the liquid crystal display panel 3. The illuminating device 4 includes a frame 5, optical sheets 7 to 9, a diffusion plate 10, LED substrates 12 and the chassis 14 as shown in FIGS. 2 and 3. The frame 5 has a square frame shape with an opening, and is arranged to fix the optical sheets 7 to 9 and the diffusion plate 10, which are stacked in this order from the top, to edge portions of the backlight chassis 14. The optical sheets 7 to 9 and the diffusion plate 10 define optical members arranged to adjust the properties (e.g., refraction, diffraction, reflection) of light that enters the liquid crystal display panel 3 from LEDs 13 included on the LED substrates 12.

The chassis 14 is made of a metal plate such as aluminum so as to have the shape of a box of low height that is formed through bending processing of the metal plate. The backlight chassis 14 is capable of housing the optical sheets 7 to 9, the diffusion plate 10 and the LED substrates 12.

The diffusion plate 10 has a rectangular shape when seen in a plan view, and is preferably made of a resin plate having a thickness of about 2 to 3 mm. The diffusion plate 10 is arranged to diffuse the light emitted from the LEDs 13, allowing uniformalization of brightness distribution of the light in its plane.

The three optical sheets 7 to 9 define thin resin sheets, which have a rectangular shape when seen in a plan view. The three optical sheets 7 to 9 are defined by a stack of the polarization selective reflection sheet 7, the lens sheet 8 and the diffusion sheet 9, which have a thickness of about 0.1 to 0.5 mm, and are stacked in this order from the top and disposed on the diffusion plate 10.

The diffusion sheet 9 is arranged to diffuse the light emitted from the diffusion plate 10, allowing further uniformalization of brightness distribution of the light. The lens sheet 8 is arranged to gather the light emitted from the diffusion sheet 9, allowing enhancement of front brightness of the light. The polarization selective reflection sheet 7 is arranged to selectively reflect the light emitted from the lens sheet 8 so that the light is not absorbed by a polarizing plate that is attached on the underside of the liquid crystal display panel 3.

The illuminating device 4 is capable of converting the light from the LEDs 13 into planate light with the use of the optical sheets 7 to 9 and the diffusion plate 10, that is, erasing shadows of the LEDs 13 (light source images), and projecting the light onto a back surface of the liquid crystal display panel 3. A power board 17 for LED arranged to supply power to the LED substrates 12, and a control board 18 arranged to drive the liquid crystal display panel 3 are provided on a back surface 14c of a bottom plate 14a of the chassis 14. A plurality of cooling members 20 to be described later, a radiator 22, a tank 23, a pump 24, and pipes 25 and 26 arranged to connect them are disposed on the back surface 14c of the bottom plate 14a of the chassis 14.

Figure 4:
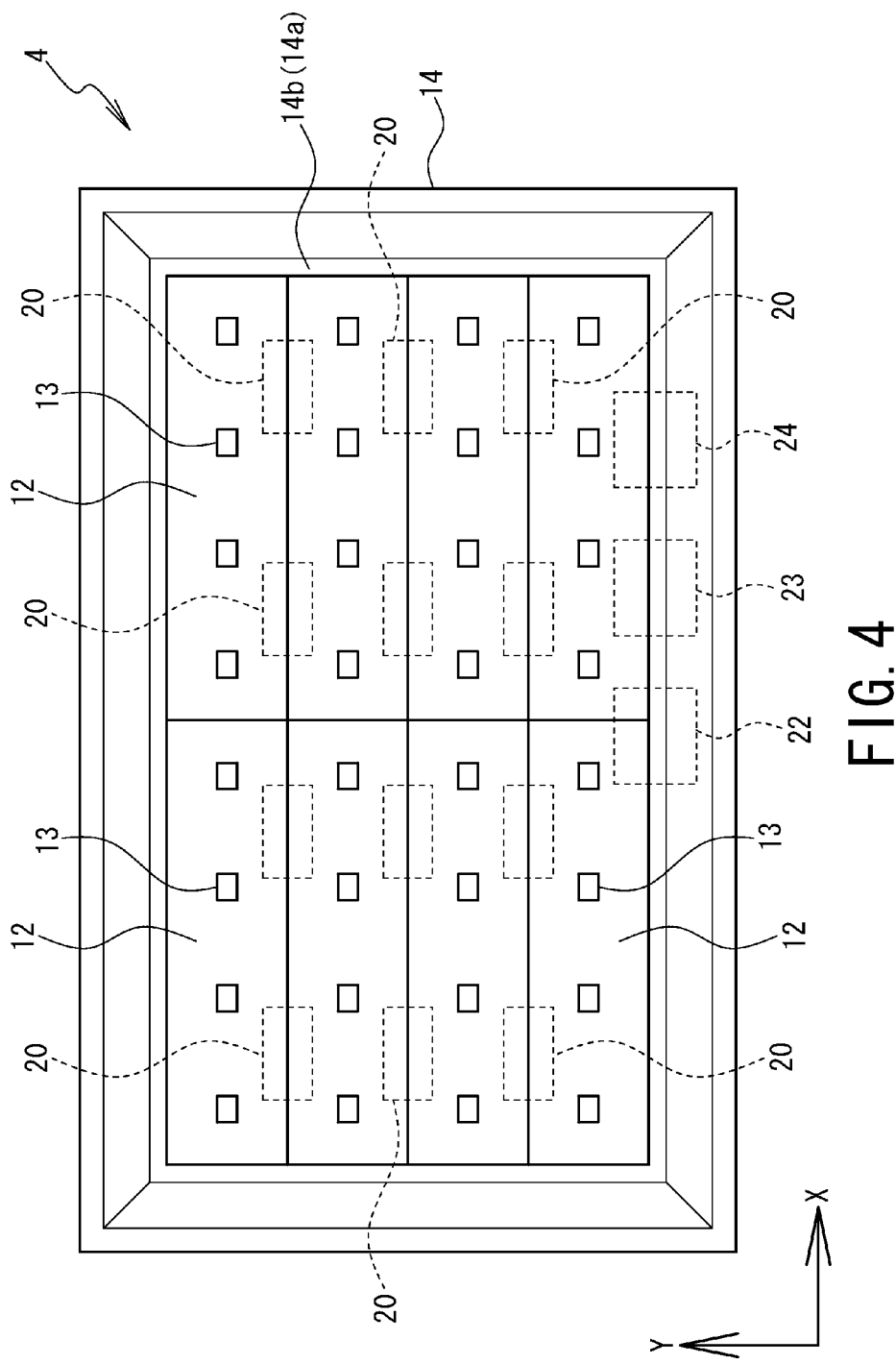
FIG. 4 is a plan view showing layout of LEDs and cooling members on a chassis included in an illuminating device shown in FIG. 3.

In the present embodiment, the eight LED substrates 12 are disposed on a holding surface 14b of the bottom plate 14a of the chassis 14 such that the two LED substrates 12 are aligned in an X-direction and the four LED substrates 12 are aligned in a Y-direction. Each of the LED substrates 12 includes a radiating plate 12a made from metal such as aluminum, and an insulating layer 12b disposed on the radiating plate 12a as shown in FIG. 3. The plurality of LEDs 13 (four LEDs 21 per LED substrate 12 in the present embodiment) disposed linearly along a longitudinal direction of the LED substrates 12 (the radiating plates 12a) are disposed on the insulating layers 12b. That is, the thirty-two LEDs 13 (four LEDs×eight LED substrates) are arranged in a matrix vertically and horizontally (in the X-direction and Y-direction) on the holding surface 14b of the chassis 14 as shown in FIG. 4.

In the present embodiment, the radiating plates 12a that has a long shape function as base members of the LED substrates 12, and function to curb an increase in temperature caused by heat generation of the LEDs 13. The radiating plates 12a are fixed to the holding surface 14b of the chassis 14 to be in planar (closely) contact therewith such that the heat generated by the LEDs 13 is conveyed to the bottom plate 14a of the chassis 14.

Each of the LEDs 13 has a package structure such that an LED chip 13a that emits blue light is encapsulated in a transparent resin into which a yellow fluorescent material is mixed, for example, and is capable of emitting white light from its top surface, i.e., a light emitting surface 13b as shown in FIG. 3. In the present embodiment, the light emitting surfaces 13b are disposed parallel to plate faces (surfaces) of the LED substrates 12.

Wiring patterns (not shown) arranged to supply power to the LEDs 13 are provided on the insulating layers 12b of the LED substrates 12. The wiring patterns provided on the LED substrates 12 are connected to an LED control unit 43 shown in FIG. 8. The LED control unit 43 is disposed on the power board 17 for LED, and arranged to control the driving (on-off driving) of each of the LEDs 13. Thus, the LED control unit 43 is arranged to control the driving (on-off driving) of each of the LEDs 13 in accordance with the state of an image displayed on the liquid crystal display panel 3.

Figure 10:
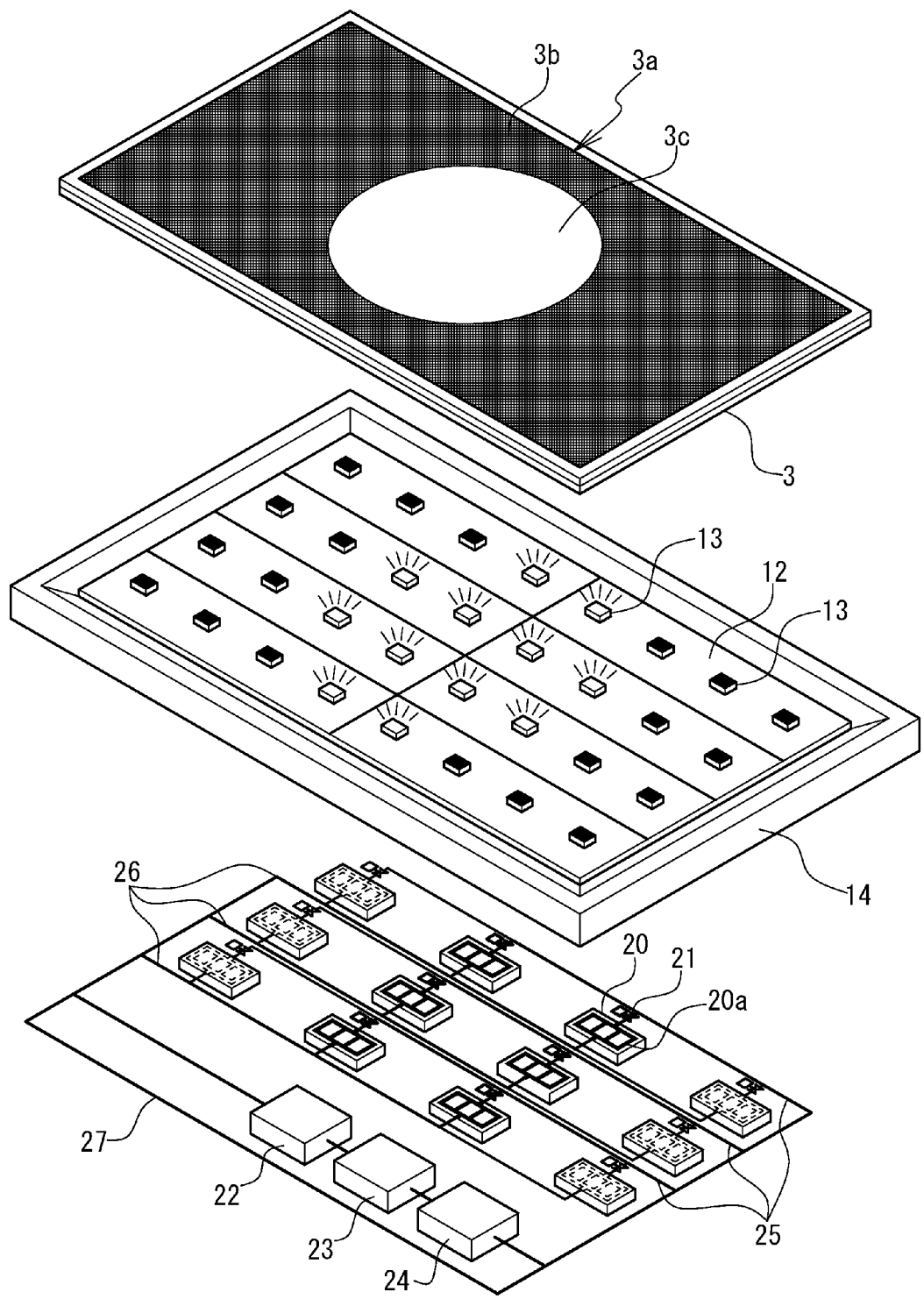
FIG. 10 is a perspective view schematically showing driving of a liquid crystal display panel, and driving of the illuminating device in accordance with the driving of the liquid crystal display device.
Figure 11A:
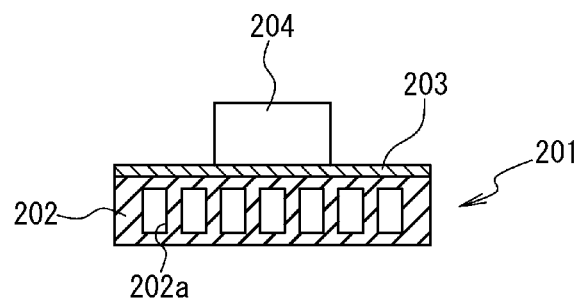
FIG. 11A is a cross-sectional view showing a schematic configuration of an LED substrate having a conventional cooling configuration.
Figure 11B:
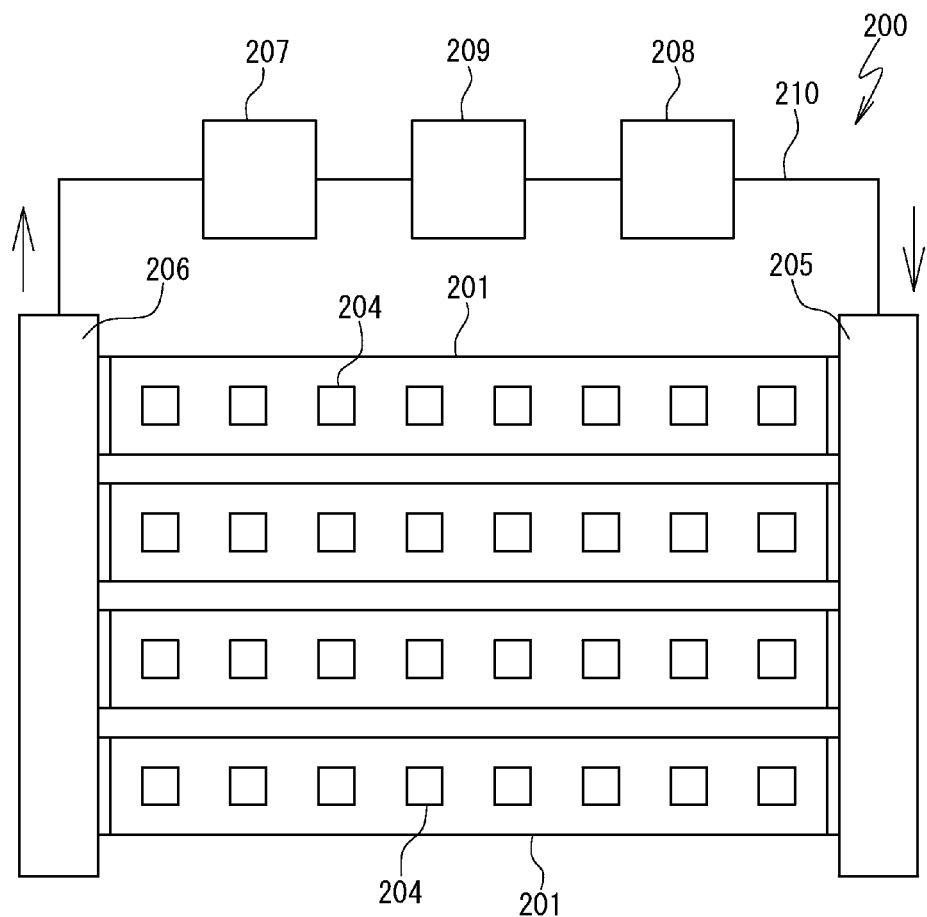
FIG. 11B is a plan view showing a schematic configuration of an illuminating device including a plurality of LED substrates.

For example, if an image 3a displayed on the liquid crystal display panel 3 includes a black display (dark display) region 3b and a non-black display (bright display) region 3c as shown in FIG. 10, the LEDs 13 that are capable of projecting light mainly onto the non-black display region 3c can be controlled to turn on while the LEDs 13 that are capable of projecting light mainly onto the black display region 3b can be controlled to turn off (unlight). Thus, contrast between the black display region 3b and the non-black display region 3c of the displayed image 3a can be enhanced. To be specific, the black color of the black display region 3b is more darkened to distinguish the white color of the non-black display region 3c, whereby contrast in the displayed image 3a can be improved.

Next, a description of the cooling members 20 disposed on the on the back surface 14c of the bottom plate 14a of the chassis 14 will be provided. The cooling members 20 are attached and fixed to the back surface 14c of the bottom plate 14a of the chassis 14 while sandwiching therebetween a thermal conductive sheet 16 that has adhesive faces on both sides. The cooling members 20 are made from metal such as aluminum to have a rectangular parallelepiped shape. Each cooling member 20 includes a plurality of channels 20a inside, through which cooling fluid runs.

A fluid inflow port 20b is provided at the upper end of each cooling member 20, and a fluid outflow port 20c is provided at the lower end of each cooling member 20. The plurality of channels 20a of each cooling member 20 gather at the fluid inflow port 20b and the fluid outflow port 20c to communicate therewith.

The cooling member 20s includes valves 21 that are connected to the fluid inflow ports 20b. The cooling fluid is passed through the channels 20a by opening the valves 21, and stopped passing through it by closing the valves 21. The fluid inflow ports 20b are connected to supplying pipes 25 via the valves 21s. The fluid outflow ports 20c are connected to return pipes 26.

Figure 5:
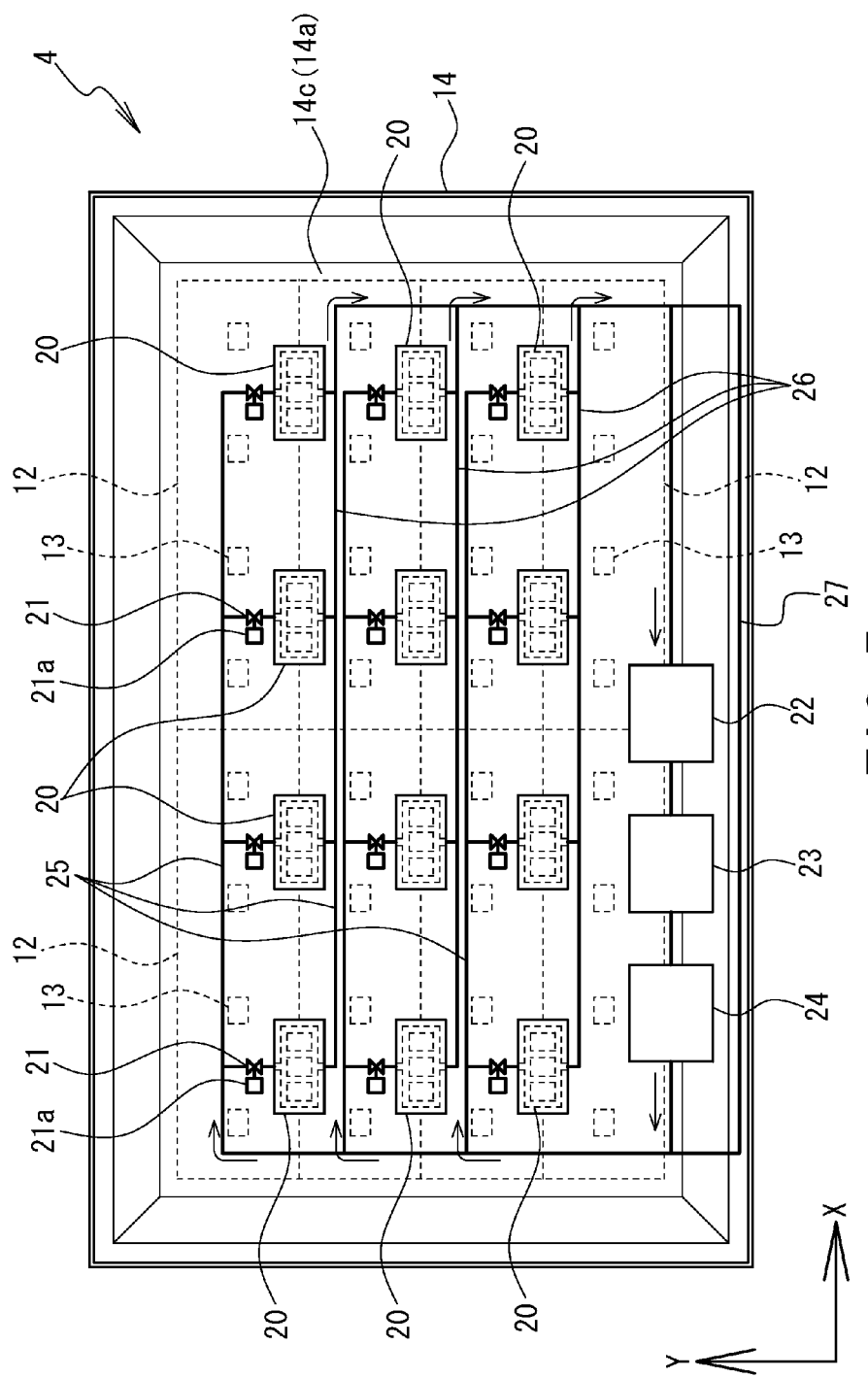
FIG. 5 is a plan view showing the illuminating device from behind.

The cooling members 20 are connected in parallel to the supplying pipes 25 connected to the pump 24, and also connected in parallel to the return pipes 26 connected to a radiator 22 as shown in FIGS. 2 and 5. The radiator 22 is connected to the pump 24 via the tank 23. The pump 24 defines a piston-type reciprocating pump arranged to pass the cooling fluid. The tank 2 defines a reservoir tank arranged to maintain the amount of the cooling fluid. The radiator 22 includes a plurality of radiating fins (not shown), and defines an air-cooled heat exchanger arranged to exchange heat between the cooling fluid and air.

Figure 6:
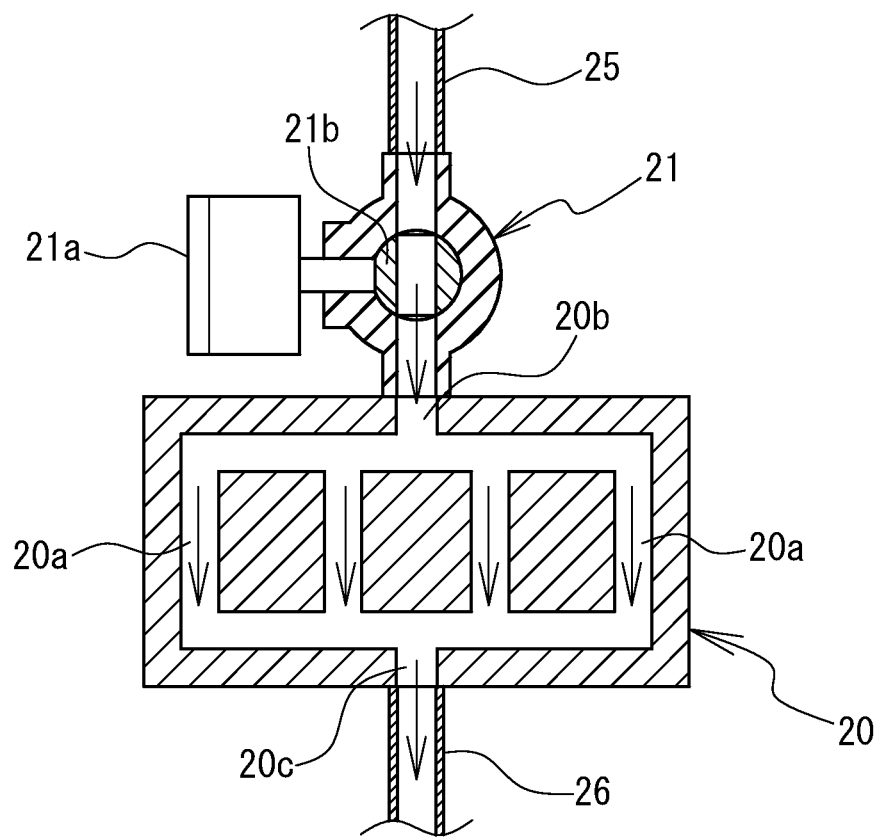
FIG. 6 is a cross-sectional view showing a schematic configuration of one of the cooling members shown in FIG. 5.

In the present embodiment, as shown in FIG. 6, each valve 21 defines a flow control valve including a ball valve 21b that can be opened by a motor 21a, which defines a stepping motor, to the fully opened degree, the degree of one half, the degree of one third, the degree of one fourth or the fully closed degree with respect to the fully opened degree, for example. Having this configuration, the valves 21 can increase and decrease (adjust) the amounts of flow of the cooling fluid that runs through the channels 20a in the cooling members 20, and are capable of changing cooling capability (cooling power) of the cooling members 20.

Figure 9:
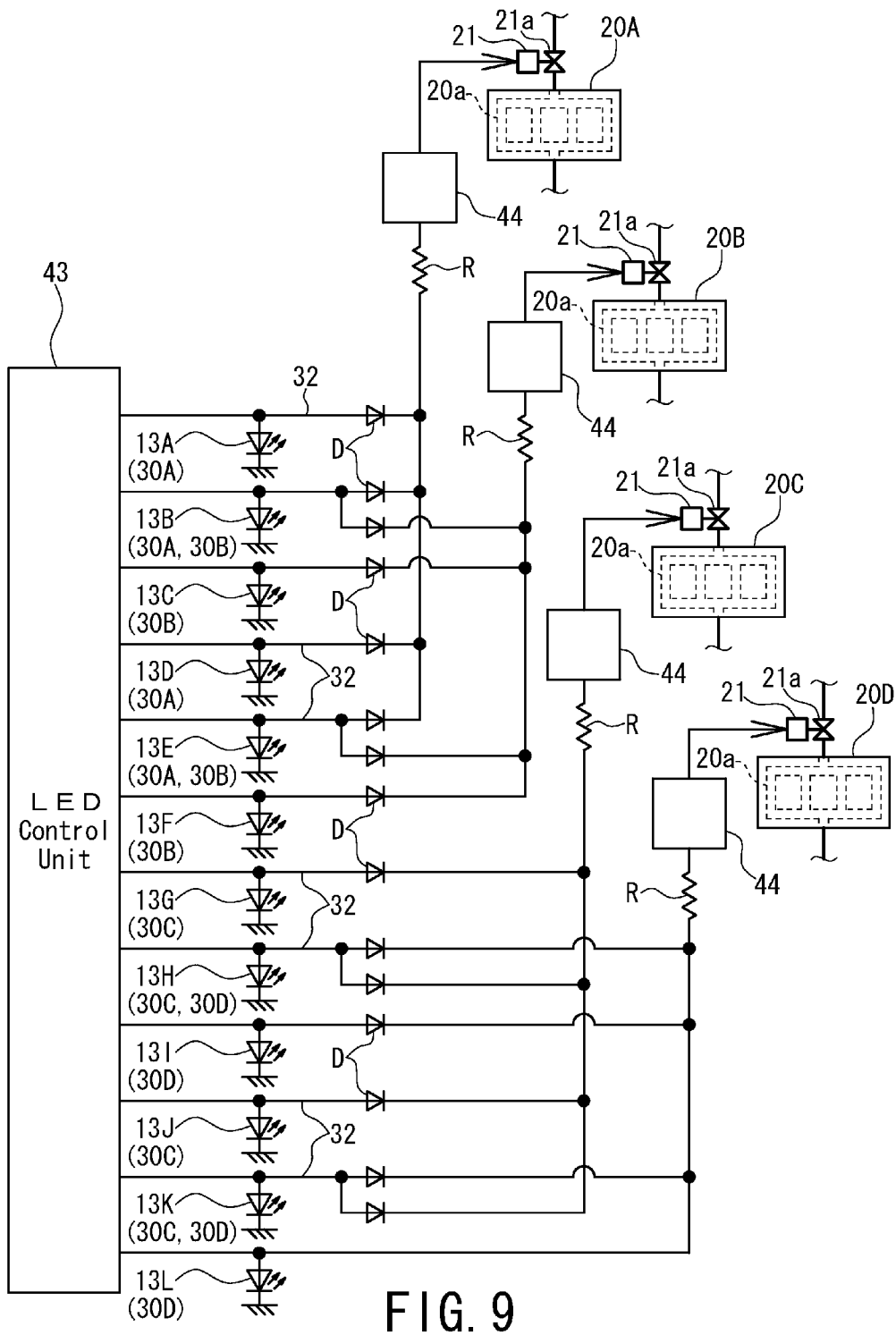
FIG. 9 is a block diagram showing a schematic configuration of an electric circuit concerning driving of the LEDs and the cooling members.

The motors 21a of the valves 21 are each connected to cooling-member control units 44 as shown in FIGS. 8 and 9, and the motors 21a are driven based on control signals outputted from the cooling-member control units 44. The pump 24 is connected to the cooling-member control units 44 as shown in FIG. 8, and is driven based on control signals outputted from the cooling-member control units 44. When the control signal is inputted from any one of the cooling-member control units 44 shown in FIG. 9, the pump 24 starts operation of supplying the cooling fluid to the corresponding supplying pipe 25. The pump 24 is connected to the radiator 22 via a bypass pipe 27 so that the cooling fluid can be supplied by the pump 24 even when all the valves 21 of the cooling members 20 are closed (see FIGS. 1 and 5).

The cooling-member control units 44 are connected to the LED control unit 43 as shown in FIGS. 8 and 9, and capable of controlling the motors 21a to be driven simultaneously with the driving (on-off driving) of the LEDs 13 by the LED control unit 43.

The cooling members 20 are arranged in a matrix vertically and horizontally (in the X-direction and Y-direction) on the back surface 14c of the chassis 14 as shown in FIG. 5. The cooling members 20 are disposed at positions associated with positions of the LEDs 13 in the chassis 14. In the present embodiment, the cooling members 20 are disposed at middle positions between the LEDs 13 that are adjacent vertically and horizontally (in the X-direction and Y-direction).

To be specific, the cooling members 20 are each disposed in regions between the LEDs 13 that are adjacent vertically (in the Y-direction), while disposed in regions provided alternately between the LEDs 13 that are adjacent horizontally (in the X-direction) as shown in FIGS. 4 and 5. In addition, each cooling member 20 is disposed at a position associated with four LEDs 13 that are disposed two by two vertically (in the Y-direction) and horizontally (in the X-direction) such that the center of each cooling member 20 is disposed at distances almost equally from the four LEDs 13.

Figure 7:
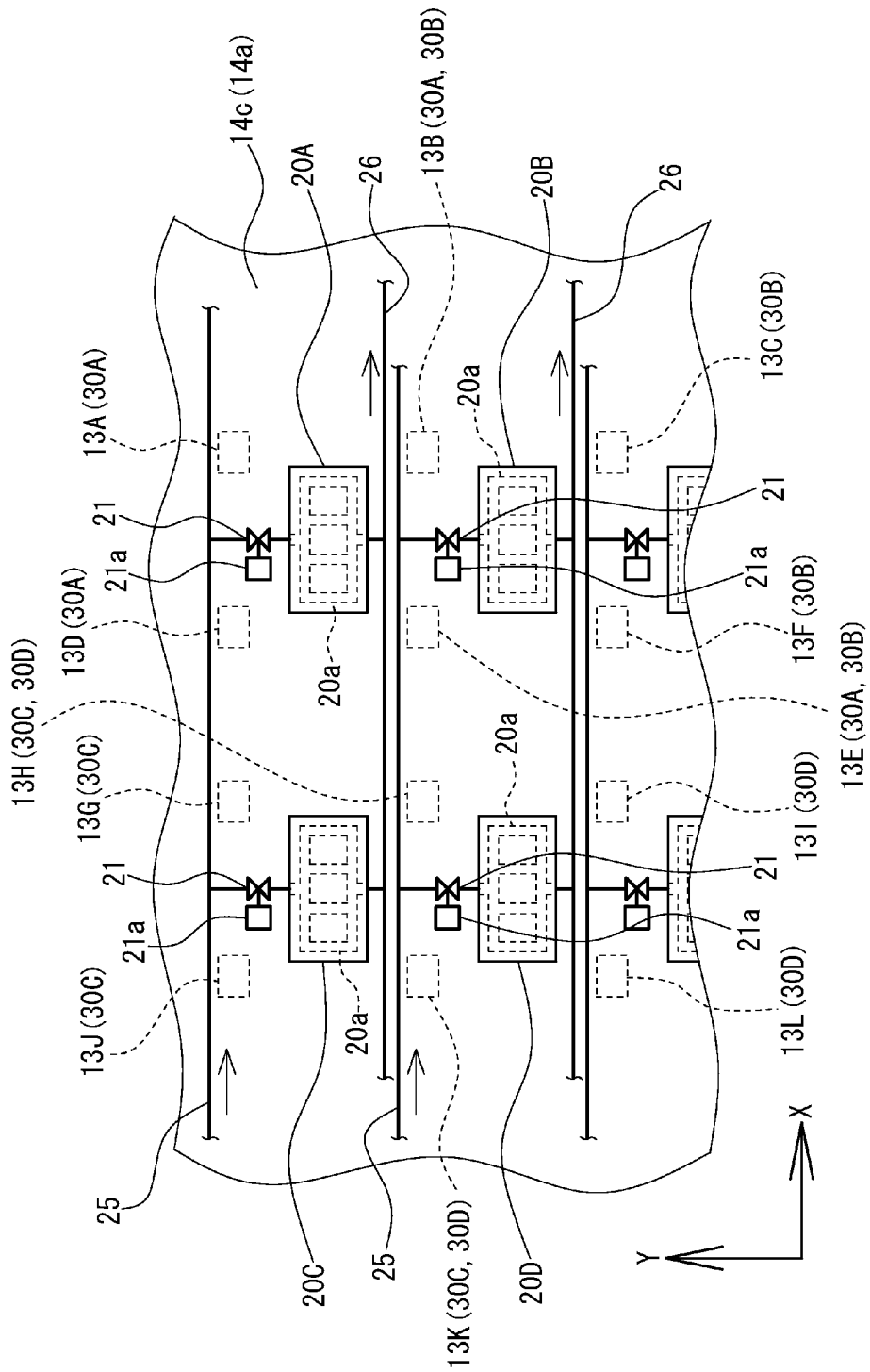
FIG. 7 is an enlarged cross-sectional view of FIG. 5.

Next, a description of a specific relation between the LEDs 13 and the cooling members 20 associated with the LEDs 13 will be provided with reference to FIGS. 7 and 10. In the description, twelve LEDs 13, which are aligned such that the three LEDs 13 are aligned vertically (in the Y-direction) and four LEDs 13 are aligned horizontally (in the X-direction), and four cooling members 20 that are associated with the twelve LEDs as shown in FIG. 7 are described for the sake of illustration.

Among the twelve LEDs 13, the three LEDs 13 in the right edge column are referred to as the first LED 13A, the second LED 13B and the third LED 13C from the top, and the three LEDs 13 in the column left to the column are referred to as the fourth LED 13D, the fifth LED 13E and the sixth LED 13F from the top, and the three LEDs 13 in the column left to the column are referred to as the seventh LED 13G, the eighth LED 13H and the ninth LED 13I from the top, and the three LEDs 13 in the column left to the column are referred to as the tenth LED 13J, the eleventh LED 13K and the twelfth LED 13L from the top. Hereinafter, the LEDs 13 are referred to as the LEDs 13A to 13L when they are distinguished from one another, and referred to as the LEDs 13 when they are not distinguished from one another and referred to generically.

The twelve LEDs 13 form four LED groups 30 (a first LED group 30A to a fourth LED group 30D). Each LED group 30 is made up of the four LEDs 13 that are adjacent vertically and horizontally (in the X-direction and Y-direction).

To be specific, the first LED group 30A is made up of the four LEDs 13 (the first LED 13A, the second LED 13B, the four LED 13D and the fifth LED 13E) that are shown in the upper right-hand corner of FIG. 7. The second LED group 30B is made up of the four LEDs 13 (the second LED 13B, the third LED 13C, the fifth LED 13E and the sixth LED 13F) that are shown in the bottom right-hand corner of FIG. 7. The third LED group 30C is made up of the four LEDs 13 (the seventh LED 13G, the eighth LED 13H, the tenth LED 13J and the eleventh LED 13K) that are shown in the upper left-hand corner of FIG. 7. The fourth LED group 30D is made up of the four LEDs 13 (the eighth LED 13H, the ninth LED 13I, the eleventh LED 13K and the twelfth LED 13L) that are shown in the bottom left-hand corner of FIG. 7. Hereinafter, the LED groups 30 are referred to as the LED groups 30A to 30D when they are distinguished from one another, and referred to as the LED groups 30 when they are not distinguished from one another and referred to generically.

In the present embodiment, the second LED 13B and the fifth LED 13E are included redundantly in both of the first LED group 30A and the second LED group 30B while the first LED 13A and the fourth LED 13D are included only in the first LED group 30A, and the third LED 13C and the sixth LED 13F are included only in the second LED group 30B. In a similar manner, the eighth LED 13H and the eleventh LED 13K are included redundantly in both of the third LED group 30C and the fourth LED group 30D while the seventh LED 13G and the tenth LED 13J are included only in the third LED group 30C, and the ninth LED 13I and the twelfth LED 13L are included only in the fourth LED group 30D.

The LED groups 30 are each associated with the cooling members 20 that are disposed in the centers of the LED groups 30 as shown in FIG. 7. To be specific, the cooling member 20 that is disposed in the center of the first LED group 30A is referred to as a first cooling member 20A. The cooling member 20 that is disposed in the center of the second LED group 30B is referred to as a second cooling member 20B. The cooling member 20 that is disposed in the center of the third LED group 30C is referred to as a third cooling member 20C. The cooling member 20 that is disposed in the center of the fourth LED group 30D is referred to as a fourth cooling member 20D. Hereinafter, the cooling members 20 are referred to as the cooling members 20A to 20D when they are distinguished from one another, and referred to as the cooling members 20 when they are not distinguished from one another and referred to generically.

Four power wires 32 each connected to the LEDs 13 (the first LED 13A, the second LED 13B, the four LED 13D and the fifth LED 13E) that form the first LED group 30A are connected in parallel to the cooling-member control unit 44, which is arranged to control the driving of the valve 21 of the first cooling member 20A, via diodes D and a resistor R as shown in FIG. 9. Thus, when any one of the LEDs 13 that form the first LED group 30A is driven, the cooling-member control unit 44 controls the valve 21 of the first cooling member 20A to be driven simultaneously with the driving of the LED 13, and cooling of the LED 13 is performed by the first cooling member 20A.

In addition, four power wires 32 each connected to the LEDs 13 (the second LED 13B, the third LED 13C, the fifth LED 13E and the sixth LED 13F) that form the second LED group 30B are connected in parallel to the cooling-member control unit 44, which is arranged to control the driving of the valve 21 of the second cooling member 20B, via diodes D and a resistor R. Thus, when any one of the LEDs 13 that form the second LED group 30B is driven, the cooling-member control unit 44 controls the valve 21 of the second cooling member 20B to be driven simultaneously with the driving of the LED 13, and cooling of the LED 13 is performed by the second cooling member 20B.

In a similar manner, when any one of the LEDs 13 that form the third LED group 30C is driven, cooling of the LED 13 is performed by the third cooling member 20C. Also in a similar manner, when any one of the LEDs 13 that form the fourth LED group 30D is driven, cooling of the LED 13 is performed by the fourth cooling member 20D.

In the present embodiment, because the second LED 13B and the fifth LED 13E are included redundantly in both of the first LED group 30A and the second LED group 30B, when either one of the second LED 13B and the fifth LED 13E is driven, the cooling-member control units 44 control the valves 21 of the first cooling member 20A and the second cooling member 20B to be driven simultaneously with the driving of the LED 13, and cooling is performed by the first cooling member 20A and the second cooling member 20B. In a similar manner, because the eighth LED 13H and the eleventh LED 13K are included redundantly in both of the third LED group 30C and the fourth LED group 30D, when either one of the eighth LED 13H and the eleventh LED 13K is driven, the cooling-member control units 44 control the valves 21 of the third cooling member 20C and the fourth cooling member 20D to be driven simultaneously with the driving of the LED 13, and cooling is performed by the third cooling member 20C and the fourth cooling member 20D.

In the present embodiment, because the valves 21 define the flow control valves, when each of the cooling members 20 is associated with some of the LEDs 13, the valves (flow control valves) 21 adjust the amounts of flow of the cooling fluid that runs in the cooling members 20 in accordance with the numbers of the lit LEDs 13. Thus, cooling capability (cooling power) of the cooling members 20 can be changed.

For example, when any one of the LEDs 13 that form the first LED group 30A (the first LED 13A, the second LED 13B, the four LED 13D and the fifth LED 13E) is driven, the cooling-member control unit 44 is capable of controlling the valve 21 of the first cooling member 20A associated with the first LED group 30A to be driven so as to be opened to the degree of one fourth with respect to the fully opened degree.

In addition, when any two of the LEDs 13 that form the first LED group 30A (the first LED 13A, the second LED 13B, the four LED 13D and the fifth LED 13E) are driven, the cooling-member control unit 44 is capable of controlling the valve 21 of the first cooling member 20A associated with the first LED group 30A to be driven so as to be opened to the degree of one half with respect to the fully opened degree.

In addition, when any three of the LEDs 13 that form the first LED group 30A (the first LED 13A, the second LED 13B, the four LED 13D and the fifth LED 13E) are driven, the cooling-member control unit 44 is capable of controlling the valve 21 of the first cooling member 20A associated with the first LED group 30A to be driven so as to be opened to the degree of three fourths with respect to the fully opened degree.

In a similar manner, when all of the LEDs 13 that form the first LED group 30A (the first LED 13A, the second LED 13B, the four LED 13D and the fifth LED 13E) are driven, the cooling-member control unit 44 is capable of controlling the valve 21 of the first cooling member 20A associated with the first LED group 30A to be driven so as to be fully opened.

When none of the LEDs 13 that form the first LED group 30A (the first LED 13A, the second LED 13B, the four LED 13D and the fifth LED 13E) is driven, the cooling-member control unit 44 is capable of controlling the valve 21 of the first cooling member 20A associated with the first LED group 30A to be driven so as to be fully closed.

In addition, when the amount of current passing through one LED 13 is increased in order to increase the brightness of the LED 13 more than usual, the amount of the flow of the cooling fluid that runs in the cooling member 20 associated with the LED 13 can be increased more than usual to cool in a positive manner the LED 13 that generates heat more due to the increased brightness.

Thus, the amounts of flow of the cooling fluid that runs in the cooling members 20 can be increased and decreased in accordance with the numbers of the lit LEDs 13 that are associated with the cooling members 20 and in accordance with the increased brightness of the LEDs 13, the heated LEDs 13 can be cooled efficiently. In addition, a rise in temperature of the cooling fluid can be curbed, so that the cooling fluid can be cooled sufficiently by the radiator 22.

The example of using the twelve LEDs and the four cooling members 20 associated with the twelve LEDs has been provided with reference to FIGS. 7 and 9; however, it is also preferable to change circuit configurations of the LEDs 13 and the cooling members 20 appropriately in accordance with the numbers and the layouts of the LEDs 13 and the cooling members 20, and are not limited to the one described above.

Next, a description of the operation of the present embodiment will be provided. When image signals such as television broadcasting signals are inputted to the image-signal processing unit 41 via the antenna 40 and the tuner 101, the signals subjected to image processing by the image-signal processing unit 41 are outputted to the liquid-crystal-display-panel control unit 42 and the LED control unit 43. Then, the liquid-crystal-display-panel control unit 42 controls the driving of the liquid crystal display panel 3, and the LED control unit 43 controls the driving of the LEDs 13. Thus, light is projected from the illuminating device 4 onto the liquid crystal display panel 3, and a given image is displayed on the liquid crystal display panel 3.

The LED control unit 43 controls the driving (on-off driving) of each of the LEDs 13 based on the signals inputted thereto from the image-signal processing unit 41. For example, if the image 3a displayed on the liquid crystal display panel 3 includes the black display (dark display) region 3b and the non-black display (bright display) region 3c as shown in FIG. 10, the LEDs 13 that are disposed so as to project light mainly onto the non-black display region 3c (specifically, disposed so as to be superimposed on the non-black display region 3c when seen in a plan view) can be turned on while the LEDs 13 that are disposed so as to project light mainly onto the black display region 3b (specifically, disposed so as to be superimposed on the black display region 3b when seen in a plan view) can be turned off (unlit).

Thus, because the LED control unit 43 controls the driving (on-off driving) of each of the LEDs 13 in accordance with the state of the image 3a displayed on the liquid crystal display panel 3, contrast between the black display region 3b and the non-black display region 3c can be enhanced, which improves contrast in the displayed image 3a. In addition, because the cooling-member control units 44 control to operate the cooling members 20 associated with the lit LEDs 13 while control not to operate the cooling members 20 associated with the unlit LEDs 13, the LEDs 13 that need to be cooled can be cooled effectively, and use efficiency of the cooling fluid can be improved.

Having the configuration described above, the illuminating device 4 described above is capable of controlling the driving (on-off driving) of the LEDs 13 with the use of the LED control unit 43, and controlling the driving of the valves 21 of the cooling members 20 associated with the LEDs 13 based on the driving of the LEDs 13 with the use of the cooling-member control units 44, i.e., controlling cooling operation of the LEDs 13 by passing the cooling fluid in the cooling members 20. Thus, this configuration makes it possible for the illuminating device 4 to control the valves 21 of the cooling members 20 associated with the lit LEDs 13 to be driven so as to cool the lit LEDs 13 by the associated cooling members 20, while making it possible for the illuminating device 4 to control the valves 21 of the cooling members 20 associated with the unlit LEDs 13 not to be driven so as not to cool the unlit LEDs 13 by the associated cooling members 20.

The illuminating device 4 is capable of selectively cooling the lit LEDs 13 that generate heat by selectively operating the cooling members 20. The LEDs 13 that need to be cooled can be cooled effectively and the cooling fluid can be prevented from deteriorating quickly compared with a conventional illuminating device that has a configuration to cool all LEDs, some of which are lit while the others are not. Thus, the illuminating device 4 is capable of preventing cooling capability of the cooling fluid from being lowered due to quick deterioration of the cooking fluid, and is also capable of improving use efficiency of the cooling fluid.

In the present embodiment, the illuminating device 4 has the configuration that each of the cooling members 20 is associated with some of the LEDs 13. If any of the LEDs 13 associated with one cooling member 20 is lit, the valve 21 of the one cooling member 20 is driven simultaneously with the lightning of the LED 13, which allows the lit LED 13 to be cooled. In addition, the number of the provided cooling members 20 can be reduced compared with a case where the cooling members 20 are associated with the LEDs 13 one by one.

In addition, because the illuminating device 4 has the configuration that the cooling members 20 are disposed at the middle positions between the adjacent LEDs 13, the adjacent LEDs 13 can be cooled equally, which allows the lit LEDs 13 to be cooled efficiently by the cooling members 20.

In addition, because the illuminating device 4 has the configuration that the valves 21 of the cooling members 20 define the flow control valves, which are controlled by the cooling-member control units 44 to increase and decrease the amounts of flow of the cooling fluid that runs in the cooling members 20 in accordance with the driving of the associated LEDs 13, if each of the cooling members 20 is associated with some of the LEDs 13, cooling capability (cooling power) of the cooling members 20 can be changed with the use of the valves (flow control valves) 21 that adjust the amounts of the flow of the cooling fluid that runs in the cooling members 20 in accordance with the number of the lit LEDs 13. To be specific, if one cooling member 20 is associated with four LEDs 13, for example, and one of the LEDs 13 is lit, the valve 21 opens the valve 21b to the degree of one fourth with respect to the fully opened degree. If one cooling member is associated with four LEDs, for example, and three of the LEDs are lit, the valve 21 opens the valve 21b to the degree of three fourths with respect to the fully opened degree. In addition, when the amount of current passing through one LED 13 is increased in order to increase the brightness of the LED 13 more than usual, the amount of the flow of the cooling fluid that runs in the cooling member 20 associated with the LED 13 can be increased more than usual, and thus the LED 13 that generates heat more due to the increased brightness can be cooled in a positive manner.

Having the configuration that the amounts of flow of the cooling fluid that runs in the cooling members 20 can be increased and decreased in accordance with the numbers of the lit LEDs 13 that are associated with the cooling members 20 and in accordance with the increased brightness of the LEDs 13, the illuminating device 4 is capable of cooling the heated LEDs 13 efficiently. In addition, a rise in temperature of the cooling fluid can be curbed, so that the cooling fluid can be cooled sufficiently by the radiator 22.

In addition, because the cooling members 20 are disposed on the back surface 14c of the chassis 14, which is opposite to the holding surface 14b, the portions of the chassis 14 that neighbor the cooling members 20 can be cooled, whereby the LEDs 13 can be cooled indirectly via the portions of the chassis 14 that neighbor the cooling members 20. In addition, because the LEDs 13 and the cooling members 20 are not disposed on the same side of the chassis 14, it is easy to install the LEDs 13 and the cooling members 20. Because the illuminating device 4 further includes the thermal conductive sheet, and the cooling members are disposed on the back surface of the chassis while sandwiching therebetween the thermal conductive sheet, the heated LEDs 13 can be efficiently cooled by the cooling members 20.

In addition, because the display device 1 described above includes the display panel 3 including the region where an image is displayed, and the above-described illuminating device 4 that is disposed behind the display panel 3, the display device 1 is capable of cooling the LEDs 13 disposed on the holding surface 14b of the chassis 14 of the illuminating device 4 in accordance with the on-off states of the LEDs 13 with the use of the cooling members 20 through which the cooling fluid runs. Thus, the cooling fluid can be prevented from deteriorating quickly, and use efficiency of the cooling fluid can be improved.

It is preferable that the display device 1 further includes the image-signal processing unit 41 arranged to process the signal for displaying the image, and the display-panel control unit 42 arranged to control the driving of the display panel 3 based on the output signal from the image-signal processing unit 41, wherein the LED control unit 43 and the cooling-member control units 44 are arranged to control the driving of the LEDs 13 and the driving of the valves 21 of the cooling members 20, respectively, based on the output signal from the image-signal processing unit 41.

This configuration makes it possible to turn on the LEDs 13 that correspond to the region other than the black display region 3b (i.e., the non-black display region 3c) in the image 3a displayed on the display panel 3 while turning off (unlighting) the LEDs 13 that correspond to the black display region 3b as shown in FIG. 10 by controlling the driving of the LEDs 13 with the use of the LED control unit 43 based on the output signal from the image-signal processing unit 41. Thus, contrast in the displayed image 3a can be improved. Further, because the display device 1 is capable of operating the cooling members 20 associated with the lit LEDs 13 while not operating the cooling members 20 associated with the unlit LEDs 13 by controlling the operation of the cooling members 20 with the use of the cooling-member control units 44 based on the output signal from the image-signal processing unit 41, the LEDs 13 that need to be cooled can be cooled effectively, and use efficiency of the cooling fluid can be improved.

The foregoing description of the preferred embodiments of the illuminating device, the display device and the television receiving device of the present invention has been presented for purposes of illustration and description with reference to the drawings. However, it is not intended to limit the present invention to the embodiments, and modifications and variations are possible as long as they do not deviate from the principles of the present invention.

For example, described above in the preferred embodiments is the configuration that one cooling member 20 is associated with four LEDs 13; however, the present invention is not limited to this configuration. Configurations such that one cooling member 20 is associated with one LED 13, that one cooling member 20 is associated with two LEDs 13, and that one cooling member 20 is associated with five or more than five LEDs 13 are preferably used. In addition, described above in the preferred embodiments is the configuration that the cooling members 20 are disposed on the back surface 14c of the bottom plate 14a of the chassis 14, which is opposite to the holding surface 14b; however, the present invention is not limited to this configuration. A configuration such that the cooling members 20 are disposed on the holding surface 14b of the chassis 14, in other words, a configuration such that the cooling members 20 are attached to back surfaces of the LED substrates 12 is preferably used. In addition, described above in the preferred embodiments is the configuration that one pump 24 arranged to supply the cooling fluid to the cooling members 20 and one radiator 22 arranged to cool the cooling fluid that returns from the cooling members 20 are used; however, the present invention is not limited to this configuration. A configuration of including a plurality of pumps 24 and a plurality of radiators 22 is preferably used.

The invention claimed is:

1. An illuminating device, the device comprising:
   a plurality of LEDs;
   a chassis comprising a holding surface on which the LEDs are arranged in a matrix;
   a plurality of cooling members that are disposed on the chassis at positions associated with positions of the LEDs, each of the cooling members comprising:
      a channel inside, through which cooling fluid runs; and
      a valve arranged to open and close the channel;
   a radiator arranged to perform heat exchange between the cooling fluid and air;
   a pump connected to the cooling members and the radiator by pipes, and arranged to circulate the cooling fluid;
   an LED control unit arranged to control driving of the LEDs; and
   cooling-member control units arranged to control driving of the valves of the cooling members associated with the LEDs based on the driving of the LEDs.

2. The illuminating device according to claim 1, wherein each of the cooling members is associated with some of the LEDs.

3. The illuminating device according to claim 1, wherein the cooling members are disposed at middle positions between the adjacent LEDs.

4. The illuminating device according to claim 1, wherein the valves of the cooling members comprise flow control valves, which are controlled by the cooling-member control units to increase and decrease amounts of flow of the cooling fluid that runs in the cooling members in accordance with the driving of the associated LEDs.

5. The illuminating device according to claim 1, wherein the cooling members are disposed on a back surface of the chassis, which is opposite to the holding surface.

6. The illuminating device according to claim 5, further comprising a thermal conductive sheet, wherein the cooling members are disposed on the back surface of the chassis while sandwiching therebetween the thermal conductive sheet.

7. A display device comprising:
 a display panel comprising a region where an image is displayed; and
 the illuminating device according to claim 1 that is disposed behind the display panel.

8. The display device according to claim 7, further comprising:
 an image-signal processing unit arranged to process a signal for displaying the image; and
 a display-panel control unit arranged to control driving of the display panel based on an output signal from the image-signal processing unit,
wherein the LED control unit and the cooling-member control units are arranged to control the driving of the LEDs and the driving of the valves of the cooling members, respectively, based on the output signal from the image-signal processing unit.

9. The display device according to claim 7, wherein the display panel comprises a liquid crystal display panel that comprises a pair of substrates, and liquid crystals filled in a space between the substrates.

10. A television receiving device including the display device according to claim 7.

* * * * *